United States Patent [19]
Rathert

[11] Patent Number: 4,516,960
[45] Date of Patent: May 14, 1985

[54] VARIABLE SPEED CHAIN DRIVE

[75] Inventor: Horst Rathert, Minden, Fed. Rep. of Germany

[73] Assignee: Rahdener Maschinenfabrik August Kolbus, Rahden, Fed. Rep. of Germany

[21] Appl. No.: 506,177

[22] Filed: Jun. 20, 1983

[51] Int. Cl.³ .................... F16H 55/54; F16H 9/00; F16H 11/02; F16H 55/30
[52] U.S. Cl. .................................. 474/49; 474/9; 474/47
[58] Field of Search ............ 474/47, 49, 50, 52, 474/53, 133–135, 9, 242

[56] References Cited

U.S. PATENT DOCUMENTS

| | | | |
|---|---|---|---|
| 741,614 | 10/1903 | Batson | 474/9 |
| 1,747,013 | 2/1930 | Karlik | 474/9 |
| 1,835,972 | 12/1931 | Schurig | 474/9 |
| 3,049,933 | 8/1962 | Besel | 474/242 |
| 3,867,851 | 2/1975 | Gregory et al. | 474/49 |
| 3,956,944 | 5/1976 | Tompkins | 474/49 |
| 3,969,948 | 7/1976 | Pipenhagen, Jr. | 474/49 |
| 3,995,508 | 12/1976 | Newell | 474/49 |
| 4,030,373 | 6/1977 | Leonard | 474/49 |
| 4,129,044 | 12/1978 | Erickson et al. | 474/49 |

FOREIGN PATENT DOCUMENTS

| | | | |
|---|---|---|---|
| 2422315 | 11/1974 | Fed. Rep. of Germany | 474/49 |
| 2828524 | 1/1980 | Fed. Rep. of Germany | 474/49 |
| 3107255 | 9/1982 | Fed. Rep. of Germany | 474/49 |
| 978916 | 4/1951 | France | 474/49 |
| 2348408 | 11/1977 | France | 474/49 |
| 616493 | 3/1980 | Switzerland | 474/49 |

Primary Examiner—Stephen J. Novosad
Assistant Examiner—Bruce M. Kisliuk

[57] ABSTRACT

A variable speed chain drive includes a driven pulley which supports radially adjustable drivers, the drivers defining a wedge-shaped opening in which the chain is received and frictionally captured. The drivers, which may include cooperating clamp and drive members mounted from the disks which define the pulley, are positioned by an adjusting mechanism.

17 Claims, 6 Drawing Figures

VARIABLE SPEED CHAIN DRIVE

BACKGROUND OF THE INVENTION (1) Field of the Invention

The invention relates to a variable-speed chain drive.

(2) Brief Description of the Prior Art

Variable-speed drives employing belts or chains as means of traction find application in various machines. One known type of infinitely variable-speed drive is the so-called PVI drive in which a disk-link chain runs between two pairs of radially toothed and beveled disks which define drive and driven sprocket wheels. By moving the beveled disks of one beveled disk pair apart and simultaneously moving the beveled disks of the other beveled disk pair together, the path followed by the chain, and thereby the rotational speed of an output shaft connected to one disk pair, can be varied. In a PIV drive, the transversely flexible chain links engage the tooth spaces of the beveled disks and positively transmit the rotational moment introduced at the drive wheel.

PIV drives are complicated in construction and therefore expensive. They also require large physical dimensions. To displace the beveled disks, which can be carried out only during operation, high axial forces are necessary, as well as a relatively long period for adjustment.

Chain drives with a limited number of transmission ratios are known from bicycle design. Their operation is unsatisfactory for various reasons. Transferring the chain from one chainwheel or sprocket to another requires time and is possible only in the absence of load. Speed is lost, particularly in downshifting on hills. Misalignment of chainwheels and sprockets produces chain skew, resulting in substantial material stress. As the chain runs onto a chainwheel or sprocket, lateral friction occurs between teeth and link plates and results not only in fretting, but also in a reduction in efficiency. Chain pitch during shifting does not conform to that of the new chainwheel, so danger exists that the chain will come off. In addition, the speed gradations are not as great as suggested by multiplication of the number of chainwheel and sprocket teeth; diametrically opposite chainwheels and sprockets normally cannot be used together because of their diagonal pull.

The object of the present invention is therefore to create a chain drive with infinitely variable transmission ratio, over a wide range of adjustment and with optimal efficiency, in which readjustment of the transmission ratio can be carried out at standstill as well as under load. Moreover, the chain drive of the present invention is considerably less expensive to produce and physically more compact than prior devices of similar character. Finally, the chain drive of the present invention permits quick and easy adjustment of the transmission ratio.

SUMMARY OF THE INVENTION

The foregoing and other objects of the present invention are accomplished by a novel chain drive which includes radially adjustable drivers. Due to the design of the radially adjustable drivers, self-locking occurs when radial force transmitted by the chain is sufficiently great to cause radial displacement of the drivers were it not for the locking action. Through the use of a fork-shaped adjusting member, the drivers can nevertheless be easily moved in the radial direction.

The drivers, running through the fork-shaped adjusting member, are moved consecutively by the latter to a radial position which corresponds to the desired pulley radius. During a shift, all drivers are brought to the desired radius. Positioning of the fork-shaped adjusting member may be carried out either gradually or abruptly. The maximum radial adjustment per pulley rotation is determined by a run-up bevel on the fork-shaped adjusting member which is selected so as to avoid jamming due to an excessively steep run-up angle.

Excessive chain length arising during diametrical adjustment is taken up by a tensioning device, which also provides the preload force in the loose side of the chain as required for transmitting chain traction.

In an advantageous embodiment the chain drive is made up of two variable-diameter pulleys. Radial adjustment of both the driving pulley and the driven pulley is effected by fork-shaped members or other adjusting devices in opposite directions. A less expensive pin-type chain can be employed in plate of a more conventional roller chain, and reversal of direction and moment of rotation is possible.

Implementation of the present invention with two variable-diameter pulleys in a closed housing permits its application to high-speed, high-output torque drives for general application. In the case of industrial machinery the chain is advisably of sturdy construction. The flanks of the chain links which press against the beveled surface or surfaces of the drivers are preferably fit to the latter to achieve planar contact, and thereby high peripheral force transfer. At high rotational speeds the radially adjustable drivers must be secured against movement resulting from centrifugal force in the area between the return side of the chain and the side under traction. This is accomplished, in a preferred embodiment, by self-locking stop levers on the drivers which prevent their undesired displacement due to outward centrifugal force, while adjustment by means of the fork-shaped adjustment members may continue to be carried out at will.

Adjustment over the entire operating range at standstill is possible if adjustment of the drivers is carried out simultaneously by means of a mechanism centric to all drivers of both pulleys and the chain tensioner is lifted in the process.

The range of application of the variable-speed chain drive of the present invention may also be extended to bicycle gears and to all motor-driven vehicles and low-output transport equipment in which power transmission occurs for structural reasons through a means of traction, and in which available output can be optimally utilized and the efficiency of the entire system considerably increased through the use of an easily operated, continuous adjustment system.

BRIEF DESCRIPTION OF THE DRAWING

The present invention may be better understood by reference to the accompanying drawing wherein.

DESCRIPTION OF THE DISCLOSED EMBODIMENT

Figure 3:
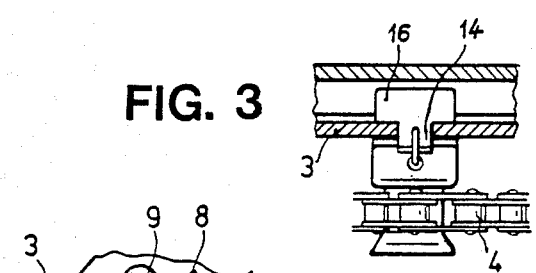
FIG. 3 is an elevational view, taken in the direction of arrow C, of the portion of the apparatus shown in FIG. 2.
Figure 5:
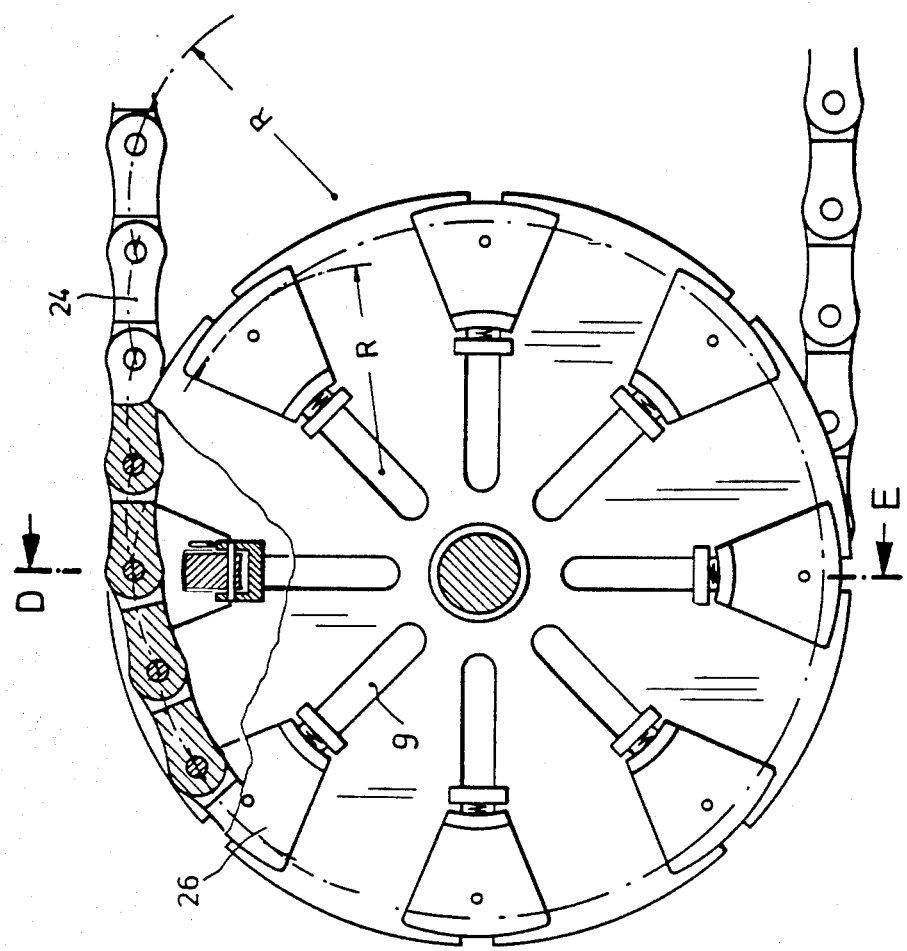
FIG. 5 is a side elevation view, partly in section, of one of the pulleys of a second embodiment of a chain drive in accordance with the present invention.
Figure 6:
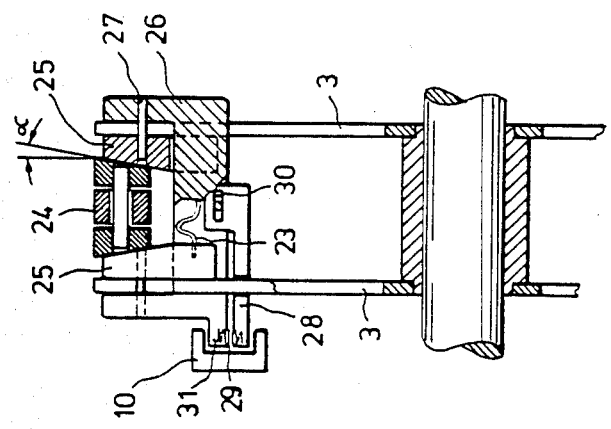
FIG. 6 is a partial cross-sectional view, taken along line D-E, of the apparatus of FIG. 5.

With reference now to the drawing, a variable speed chain drive in accordance with the present invention will comprise a drive pulley 1, a driven pulley and, of course, means for delivering torque to the drive pulley and thus applying traction to a drive chain. Drive pulley 1 is coupled to an axle 2 to which torque may be applied. The pulleys, as may best be seen from the FIG. 6, are typically defined by cooperating pairs of disks 3. At least one of the pulleys will be provided with a plurality of uniformly spaced drivers. These drivers, indicated at 16 for the embodiment of FIGS. 1-4 and at 26 for the embodiment of FIGS. 5 and 6, are adjustable in radial slots 9 in the disk or disks which define the pulleys. The drivers impart movement to clamping elements which are designed to grip a chain, indicated in FIGS. 1 and 3 at 4 and in FIGS. 5 and 6 at 24, in pincer fashion in non-positive drive, i.e., there is no engagement of the chain links by a sprocket wheel or the like. The drivers may be freely moved in the radial direction in slots 9 by means of an adjusting mechanism. The drivers are also automatically locked against the radial component of the tractive force of the chain.

As mentioned above, the drivers of the disclosed embodiments of the present invention impart radial movement to clamping elements. The clamping elements are indicated at 8 and 13 in FIGS. 1, 2 and 4 and at 25 in FIG. 6. The clamping elements cooperate to define wedge-shaped openings between the disks. The rounded ends of the pins 17 of the chain (4, 24) define bearing surfaces which press against the opposing surfaces 18 and 19, respectively on clamping elements 8 and 13, which define the wedge-shaped openings. The clamping elements (8, 13, 25) are supported by the pulley disks. The above-described wedging action results from the tractive force transmitted through the chain which is coupled from the main chain links to the oppositely disposed faces of the clamping elements as may best be seen from FIG. 6. The force transmitted to the contacted surfaces of the clamping elements by the chain produces a self-locking action and results in frictional engagement between the chain and the pulley disks.

It is to be noted that the diagonal, i.e., the slanted, faces of the clamping elements 8, 13, and 25 preferably exhibit an angle of less than six degrees in a radial direction relative to the plane of the pulley disks.

The radial adjustment of the drivers in accordance with the present invention is accomplished through the use of adjusting members 10. The adjusting members 10 directly contact the drivers 16 and 26, as may be seen in FIGS. 2 and 6, in the region between the loose side of the chain and the side which is under traction. This may best be seen from FIG. 1 wherein the means for positioning the adjusting member is indicated at 11, 12. The adjusting members 10 are fork-shaped and include a run-up bevel. The drivers, particularly the driver 16 of the embodiment of FIGS. 1-4 and driver 26 and a member 28 of the embodiment of FIGS. 5 and 6, run through the track defined by the times or arms of the fork-shaped adjusting member 10 and thus may be positioned at the desired pulley radius.

In the embodiment of FIGS. 1-4 the clamping element 8 may be integral with driver 16 and driver 16 will be coupled to clamping element 13 by means of a projection 14 which extends through a slot 9 in a pulley disk 3. In the embodiment of FIGS. 5 and 6, the driver 26 is coupled to the clamping elements 25 by pins 27 which extend through slots 9.

In the disclosed embodiments spring elements 15, in the case of the embodiment of FIGS. 1-4, and 23, in the case of the embodiment of FIGS. 5 and 6, cause the clamping elements (8,13 and 25) to be pressed against facing surfaces of the pulley disks. Accordingly, free movement of the clamping elements in the radial direction is prevented.

In the region between the points of engagement and disengagement with the chain, a locking mechanism may be employed to prevent the drivers from being moved radially outwardly under the influence of centrifugal force. This locking mechanism, indicated at 28, 29, 30 and 31 in FIG. 6, is self-locking and does not prevent movement of the drivers by the adjusting member 10.

The chain 4, 24 will be of sturdy construction and, as may be seen in FIG. 6, the flanks of the chain links may be shaped to complement the tapered surfaces of the clamping elements.

Figure 2:
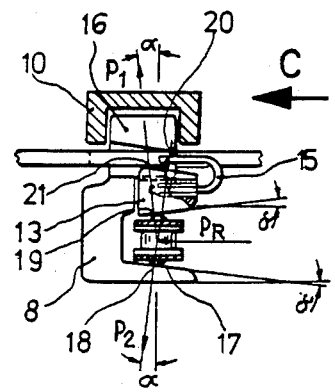
FIG. 2 is a partial cross-sectional view, taken along line A-B of FIG. 1, of the apparatus of FIG. 1.
Figure 4:
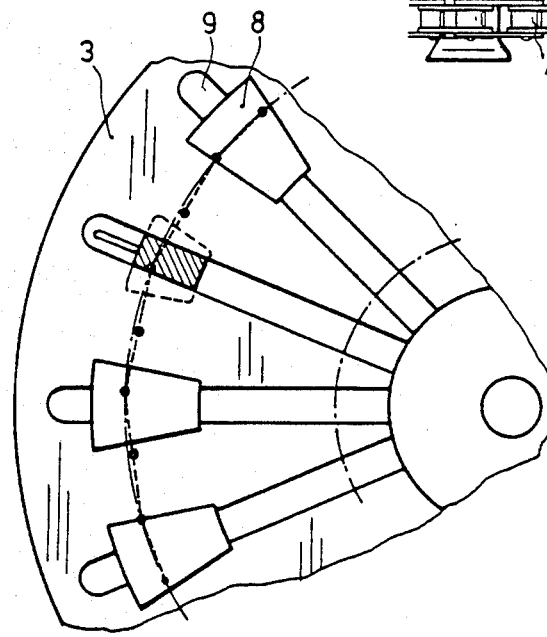
FIG. 4 is a side elevation view, on an enlarged scale, of a portion of one of the pulleys of the apparatus of FIG. 1.

It is further to be noted that the clamping elements may tilt slightly in a radial direction about their line of contact with the driving disk or disks. Referring to FIG. 2, the pivot point for driver 16 and thus for clamping element 8 is indicated at 20 while the pivot point for clamping element 13 is indicated at 21.

A variable speed chain drive in accordance with the present invention may further have a central adjusting mechanism which simultaneously adjusts all drivers when the chain tension is released.

Referring again to the embodiment of FIGS. 1-4, the drivers 13 are mounted on a single disk 3 of the driven pulley. Drivers 13 cooperate with an opposing diagonal surface on a single clamping element 8 which is supported by the other disk 3 of the pulley.

Figure 1:
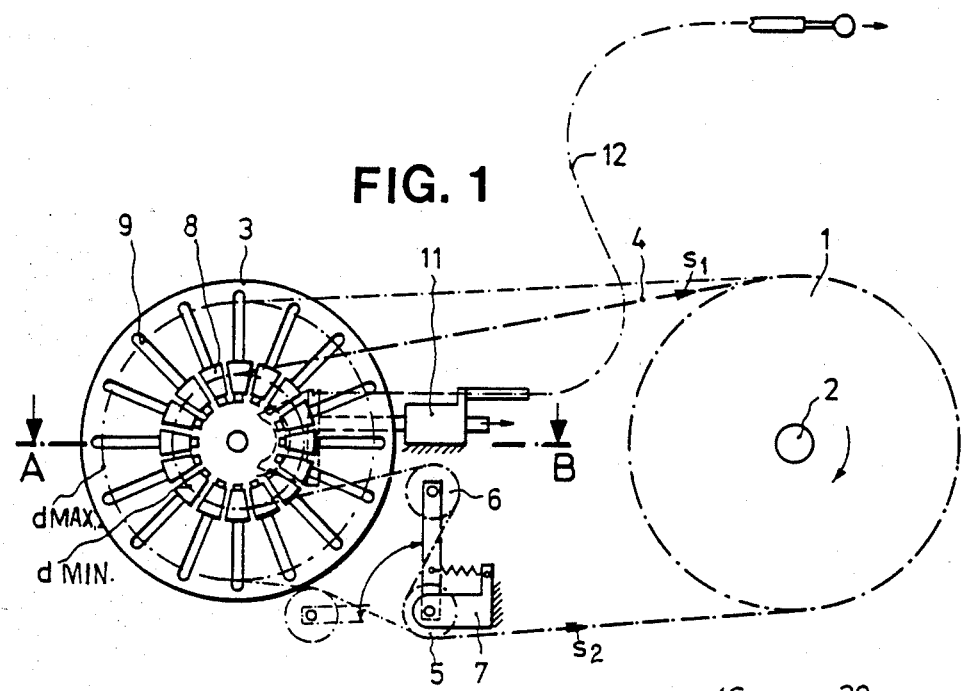
FIG. 1 is a schematic illustration of a variable speed chain drive in accordance with a first embodiment of the present invention.

Continuing to refer to FIG. 1, apparatus in accordance with the present invention also preferably includes a chain tensioning mechanism, indicated at 5, 6, 7, of a type known in the art, which takes up excess chain length produced by diametrical variations.

While preferred embodiments have been shown and described, various modifications and substitutions may be made thereto without departing from the spirit and scope of the invention. Accordingly, it is to be understood that the present invntion has been described by way of illustration and not limitation.

What is claimed is:

1. A variable speed chain drive comprising a pair of pulleys and a drive chain, at least a first one of said pulleys being in part defined by at least a first disk-shaped member, said disk-shaped member supporting a plurality of uniformly spaced drive means, said drive means being in part positioned in radial slots in the said disk-shaped member, said drive means defining a space for receiving said chain, said drive means gripping said drive chain in pincer fashion in non-positive drive, said drive means being movable in a radial direction relative to the axis of rotation of said first pulley and locking automatically against the radial component of the tractive force of the chain, and adjusting means for imparting radial motion in a desired direction to said drive means.

2. A variable speed chain drive as described in claim 1 wherein said drive chain extends part way around said first pulley thus defining a generally wedge-shaped area of said first pulley bounded by radii thereof extending from the point where contact is established between said drive means and said drive chain and where contact between said drive means and drive chain is discontinued and wherein said adjusting means is positioned to contact said drive means in said wedge-shaped area of said first pulley.

3. A variable speed chain drive as described in claim 1 wherein said drive means are further secured by locking means which is self-locking against centrifugal force.

4. A variable speed chain drive as described in claim 1 wherein said drive means has a pair of tapered surfaces which cooperate to define the chain receiving opening and the links of said chain have their flanks shaped to complement the tapered surfaces of said drive means.

5. A variable speed chain drive as described in claim 1 further having a central adjusting mechanism which simultaneously adjusts all of said drive means when chain tension is released.

6. A variable speed chain drive as described in claim 1 wherein said said first pulley comprises a second disk and wherein said drive means are mounted on said one disk and each of said drive means includes a driver which cooperates with a single clamping element supported on the said second disk, an outwardly facing wedge-shaped opening for receiving the chain being in part defined by said clamping elements.

7. A variable speed chain drive as described in claim 1 further having a chain tensioning mechanism which takes up excess chain length produced by diametrical variations.

8. A variable speed chain drive comprising a pair of pulleys and a drive chain, said pulleys each having an axis of rotation and at least a first one of said pulleys being in part defined by a pair of disks, at least one of said disks having a plurality of uniformly spaced radially oriented guide slots, drive means, said drive means being in part positioned in said guide slots in said one disk and extending into the space between said disks, said drive means including pairs of clamping elements which cooperate to form a wedge-shaped chain receiving opening, said clamping elements each having a diagonal face against which said drive chain presses, and adjusting means for imparting radial motion along said slots in a desired direction to said clamping elements whereby the effective diameter of said first pulley is infinitely variable between limits established by the ends of said slots, the tractive force of said drive chain producing a wedging action between said chain and the said diagonal faces of said clamping elements whereby said clamping elements will grip said drive chain in pincer fashion in non-positive drive, the tractive force being transmitted to contacting surfaces of said clamping elements and disks and the resulting frictional engagement causing said clamping elements to be self-locked against the radial component of the tractive force.

9. A variable speed chain drive as described in claim 8 wherein said at least one disk defines a plane and wherein said diagonal faces of said clamping elements preferably exhibit an angle of less than 6° in a radial direction in relation to said plane defined by said one pulley disk.

10. A variable speed chain drive as described in claim 9 wherein said drive chain extends part way around said first pulley thus defining a generally wedge-shaped area of said first pulley bounded by radii thereof extending from the point where contact is established between said clamping elements and said drive chain and where contact between said clamping elements and drive chain is discontinued and wherein said adjusting means is positioned to contact said drive means in said wedge-shaped area of saif first pulley.

11. A variable speed chain drive as described in claim 10 further comprising spring means for causing said clamping elements to be pressed against at least said one disk to thereby prevent free movement of said clamping elements in a radial direction.

12. A variable speed chain drive as described in claim 11 wherein said drive means are further secured by locking means which is self-locking against centrifugal force.

13. A variable speed chain drive as described in claim 12 wherein the links of said chain have their flanks shaped to complement the tapered surfaces of said drive means.

14. A variable speed chain drive as described in claim 13 wherein said clamping elements are mounted so as to be capable of tilting slightly in a radial direction about their line of contact with the said one disk.

15. A variable speed chain drive as described in claim 9 wherein said chain is comprised of links and said links of said chain have their flanks shaped to complement said diagonal surfaces of said clamping elements.

16. A variable speed chain drive as described in claim 8 further comprising spring means for causing said clamping elements to be pressed against at least said one disk to thereby prevent free movement of said clamping elements in a radial direction.

17. A variable speed chain drive comprising a pair of pulleys and a drive chain, at least a first one of said pulleys being in part defined by at least a first disk-shaped member, said disk-shaped member supporting a plurality of uniformly spaced drive means, said drive means being in part positioned in radial slots in the said one disk, said drive means defining a space for receiving said chain, said drive means tilting slightly in a radial direction about the line of contact with said at least one disk, said drive means gripping said chain in pincer fashion in non-positive drive, said drive means being movable in a radial direction relative to the axis of rotation of said first pulley and locking automatically against the radial component of the tractive force of said drive chain, and adjusting means for imparting radial motion in a desired direction to said drive means to thereby vary the effective diameter of said first pulley.

* * * * *